Dec. 24, 1963   N. A. MARSHALL   3,115,595
PULSED GAS TUBE ELECTROMETER
Filed Aug. 11, 1960

INVENTOR.
NEIL A. MARSHALL

BY

ATTORNEYS

United States Patent Office 3,115,595
Patented Dec. 24, 1963

3,115,595
PULSED GAS TUBE ELECTROMETER
Neil A. Marshall, 2351 Rocking Horse Road,
Rolling Hills, San Pedro, Calif.
Filed Aug. 11, 1960, Ser. No. 49,109
2 Claims. (Cl. 317—149)
(Granted under Title 35, U.S. Code (1952), sec. 266)

The invention described herein may be manufactured and used by or for the Government of the United States of America for governmental purposes without the payment of any royalties thereon or therefor.

This invention relates to a threshold electrometer and more particularly to a threshold electrometer in which the detected energy is added to a periodic pulse at the input of a threshold type discharge device.

In the prior art, currents developed in high impedance detectors such as ionization chambers and vacuum photo cells have been detected through the technique of collecting the output current from the detector in an integrating capacitor. The integrating capacitor is connected as an input to a threshold discharge device, such as a thyratron or neon tube. When the voltage on the integrating capacitor has exceeded the threshold value of the tube, conduction will take place which discharges the integrating capacitor and actuates an indicating circuit, such as a meter or electromechanical register. This arrangement has the disadvantage that, as the firing potential of the gas tube is approached, leakage current will flow between the cathode of the gas tube and the control element, which lowers the detector impedance and destroys the accuracy of the entire system.

According to the invention, a high impedance detector is coupled to an integrating capacitor, the other side of which is fed with a train of positive pulses. The common connection of the positive pulse train is connected to the cathode of a threshold discharge device such as a thyratron tube. As the integrating capacitor builds up a positive charge, the addition of the positive pulses will bring the control element of the threshold device closer to the firing potential. Between pulses, however, the charge on the integrating capacitor is not sufficiently close to the firing potential to be in the high current leakage region. As the potential builds up on the capacitor, the addition of the positive pulse will finally trigger the threshold device, which discharges the integrating capacitor and can be utilized in actuating a current indicating means in the circuit. Thus, the disadvantage of the prior art of attracting excessive control element leakage current as the integrating capacitor approaches the firing potential of the threshold device has been largely alleviated in that the only time the high leakage current area is reached is during the short period or pulse width of the positive pulses applied to the integrating capacitor. If the duty cycle of the positive pulses is sufficiently low, this leakage current will have a negligible effect on the accuracy of the system.

It is thus an object of the present invention to provide a threshold electrometer in which control element leakage current is negligible.

Another object of the present invention is the provision of a threshold electrometer which can utilize energy detectors of extremely high impedance.

A further object of the invention is to provide a threshold electrometer which is extremely accurate.

Yet another object of the present invention is to provide a threshold electrometer which is simple, light weight and inexpensive.

These and other objects of the present invention will become more readily apparent with reference to the following detailed description taken in conjunction with the drawings, in which.

Figure 1:
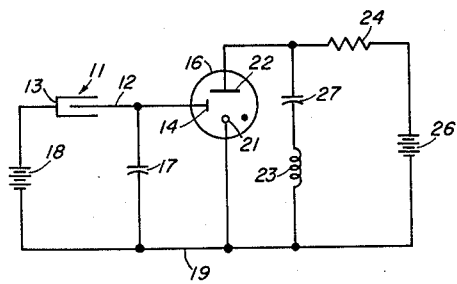
FIG. 1 is a schematic representation of a typical prior art threshold electrometer.

Referring to FIG. 1, there is shown detector 11 having output electrode 12 and common electrode 13. Output electrode 12 is connected to control element 14 of gas tube 16 and to integrating capacitor 17. Common electrode 13 is connected to the positive side of D.C. source 18, the negative side of which is connected to common bus 19. Cathode 21 of gas tube 16 and the other side of integrating capacitor 17 are each connected to common bus 19. Anode 22 of gas tube 16 is connected through resistance 24 to the positive side of D.C. source 26. Anode 22 is also connected through firing capacitor 27 and register coil 23 to common bus 19.

Figure 2:
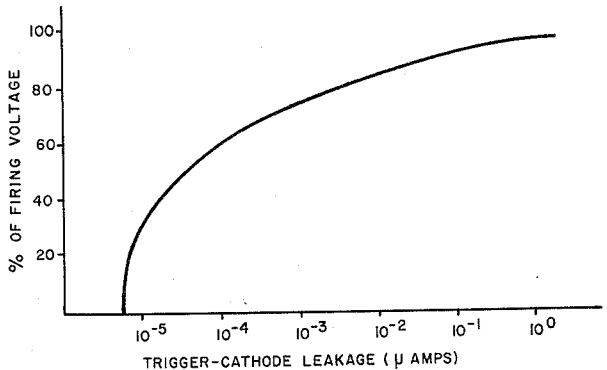
FIG. 2 is a graphic representation of the control element leakage current of a three element gas tube.

Referring to FIG. 2, there is shown a graphic represention of cathode to control element leakage current plotted against percentage of firing voltage which exists between the control element and cathode of a typical gas tube.

Figure 3:
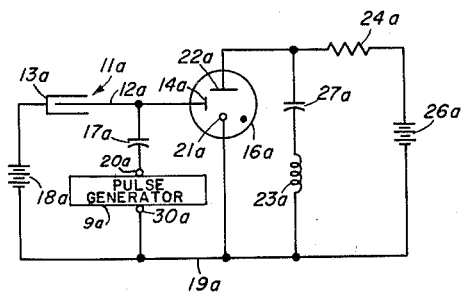
FIG. 3 is a schematic representation of one embodiment of the present invention.

Referring to FIG. 3, there is shown high impedance detector 11A having an output element 12A connected to control element 14A of gas tube 16A and one side of integrating capacitor 17A. The other side of capacitor 17A is connected to terminal 20A. Connected in series with capacitor 17A and across terminals 20A and 30A is a conventional pulse generator 9A for generating a train of sharp, intermittent, positive pulses having a low duty cycle. Common electrode 13A of detector 11A is connected to the positive side of D.C. source 18A, the negative side of which is connected to common bus 19A. Anode 22A is connected through resistance 24A to the positive side of source 26A, the negative side of which is connected to bus 19A. Anode 22A is also connected to one side of firing capacitor 27A, the other side of which is connected through electromagnetic register coil 23A back to common bus 19A.

Figure 4:
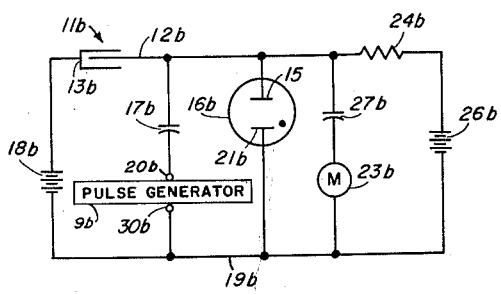
FIG. 4 is a schematic representation of another embodiment of the present invention.

Referring to FIG. 4, there is shown high impedance detector 11B having an output electrode 12B connected to element 15 of gas diode 16B and to one side of integrating capacitor 17B to terminal 20B. Common electrode 13B of detector 11B is connected to the positive side of source 18B, the negative side of which is connected to common bus. 19B. Element 21B of gas diode 16B and terminal 30B are also connected to common bus 19B. Element 15 of gas diode 16B is connected through resistance 24B to the positive side of source 26B, the negative side of which is connected to common bus 19B. Element 15 is also connected to one side of firing capacitor 27B the other side of which is connected through meter 23B to common bus 19B. Connected in series with capacitor 17B and across terminals 20B and 30B is a conventional pulse generator 9B for generating a train of sharp, intermittent, positive pulses having a low duty cycle.

*Operation*

Referring back to FIG. 1, gas tube 16 can be a conventional three element thyratron type tube. Detector 11, in this embodiment, is a photo electric detector, and solenoid coil 23 actuates an electromechanical register each time thyratron 16 fires. Capacitor 17 integrates the current flow from photo electric detector 11 and becomes charged up toward the firing potential of thyratron 16 since it is placed between control element 14 and cathode 21. Thyratron 16 will eventually fire actuating electromechanical register solenoid 23. Firing capacitor 27 discharges through thyratron 16 until the extinguishing point of thyratron 16 is reached, at which time the tube will no longer conduct and integrating capacitor 17 will begin building up its charge again from photoelectric detector 11. It is easily seen that the number of firings or pulsings of thyratron 16 will be directly proportional to the energy detected by photoelectric detector 11. As pointed out above in this prior art type of detector circuit, a serious disadvantage results from the leakage current flowing between cathode 21 and control element 14 as the firing potential as developed across integrating capacitor 17 is approached. This relationship is shown in FIG. 2 with the percentage of firing voltage plotted against leakage current flowing between cathode and the control element. It can be seen from this graph that as the potential between the control element and the cathode increases past 50 percent of the firing potential, leakage current increases rapidly. Thus, if the impedance of the detector is to be maintained at a high value and small quantities are being detected which result in extremely small currents, this leakage current must be eliminated.

Referring to FIG. 3, a preferred embodiment of the present invention is shown. Each element of FIG. 3 has the same relative function as its corresponding element of FIG. 1, i.e., tube 16A is a conventional three element thyratron, detector 11A a photoelectric detector or ionization chamber or any suitable high impedance detector, solenoid 23A actuates an electromechanical register, etc. The sole difference between the two circuits lies in the application of a train of sharp positive pulses applied at terminals 20A and 30A. These pulses are poled so that terminal 20A is positive with respect to terminal 30A and, as can be seen, terminal 30A is connected directly to common bus 19A which is tied directly to cathode 21A of thyratron 16A. In the preferred embodiment, the positive pulses applied to terminal 20A with respect to common bus 19A will in the preferred embodiment, be approximately fifty percent of the firing potential required between control element 14A and cathode 21A of thyratron 16A. Thus as integrating capacitor 17A builds up its charge, periodically a positive pulse will "ask" the thyratron 16A how close the charge of integrating capacitor 17A is to the firing potential of the tube. Obviously, as the charge on integrating capacitor 17A builds up to a point where added to the amplitude of the positive pulses applied at terminal 20A it exceeds the firing potential of tube 16A, the tube will fire and electromechanical register solenoid 23A will be actuated.

With the interrogating pulse added to the charge of integrating capacitor 17A leakage current of any great magnitude will flow only during this pulse as the tube is brought up rapidly to the firing potential, and if the duty cycle is extremely low, the leakage current will be negligible and not destroy the accuracy of the system nor the high impedance of detector 11A.

Referring to FIG. 4, the present invention is shown as applied to a simple two element neon tube. As is well known in the art, a two element neon tube has a higher firing potential than is necessary to keep the tube conducting. Thus, as integrating capacitor 17B adds to the interrogating pulse at terminal 20B to result in the firing potential of neon tube 16B, tube 16B will fire and firing capacitor 27B will discharge through meter 23B and tube 16B to the extinguishing potential of the tube. At this point capacitor 17B will again begin accumulating its charge from detector 11B until the interrogating pulse added to the charge on integrating capacitor 17B again equal the firing potential of neon tube 16B resulting in a further pulsing of tube 16B.

While a photo electric detector has been shown the inventive concept of interrogating the integrating capacitor has obvious utility with any high impedance detector. Also, any current responsive means can be utilized in place of the electromechanical register described.

Obviously many modifications and variations of the present invention are possible in the light of the above teachings. It is therefore to be understood that within the scope of the appended claims the invention may be practiced otherwise than as specifically described.

What is claimed is:

1. Apparatus for monitoring an energy field comprising a high impedance detector responsive to said energy field for producing a unidirectional output current whose strength sympathetically varies with the strength of the energy field being monitored; a threshold discharge device having respective cathode, anode and control electrodes and being of the class wherein conduction between the cathode and anode thereof results only when a certain potential, defined as the firing potential, is reached between the cathode and the control electrodes and wherein, once said discharge device is actuated to fire, the control electrode thereof loses its control function until said discharge device is again rendered quiescent, said discharge device being extinguished when the anode electrode thereof is reduced to a certain potential, known as the extinction potential, with respect to the cathode electrode thereof, the control electrode of said threshold discharge device being connected to the output of said detector; current-responsive indicating means connected to the output of said threshold discharge device for indicating the number of firings of said threshold discharge device; means in circuit with said threshold discharge device for deactuating said threshold discharge device by reducing the anode electrode potential to the extinction potential a given time interval after said threshold discharge device has been fired; a first source of direct current voltage in circuit with the cathode and anode electrodes of said threshold discharge device; a second source of direct current voltage in circuit with said high impedance detector; an integrating capacitor, connected to the output of said detector and to the control electrode of said threshold discharge device, for integrating the output current from said detector and applying the resulting voltage to the control electrode of said threshold discharge device; and means, whose output is connected to the control electrode of said threshold discharge device, for generating and adding to the integrated output signal from said detector a train of periodic intermittent unidirectional interrogating pulses, each of the pulses of said train of pulses being of the same polarity as the integrated output signal from said detector and of an amplitude less than the firing potential of said threshold discharge device and said train of pulses being characterized by a high ratio of pulse spacing to pulse duration.

2. The apparatus of claim 1 wherein each of the pulses of said train of pulses has an amplitude which is approximately half the firing potential of said threshold discharge device.

References Cited in the file of this patent

UNITED STATES PATENTS

| | | |
|---|---|---|
| 1,933,976 | Hanson | Nov. 7, 1933 |
| 2,466,634 | Breen | Apr. 5, 1949 |
| 2,735,947 | Molloy | Feb. 21, 1956 |
| 2,805,363 | Baker et al. | Sept. 3, 1957 |